Sept. 28, 1971              Z. MARCINIAK                3,608,346
       METHOD OF PRODUCING METAL OBJECTS HAVING ROTATIONAL
              SMOOTH OR TOOTHED SURFACES, AND DEVICE
                  FOR PUTTING THE METHOD INTO EFFECT
Filed Feb. 4, 1969                                 3 Sheets-Sheet 1
FIG. IA
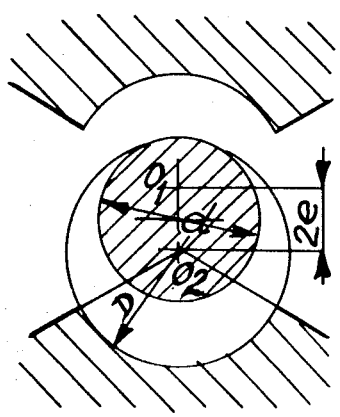
FIG. IB
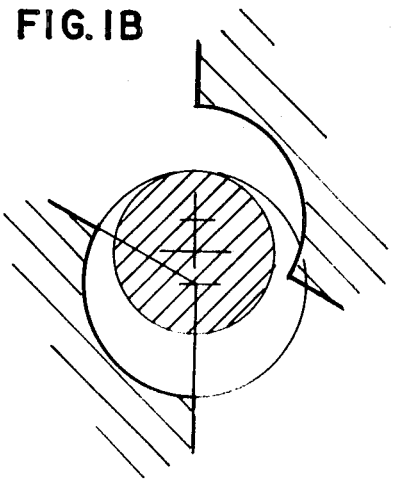
FIG. IC
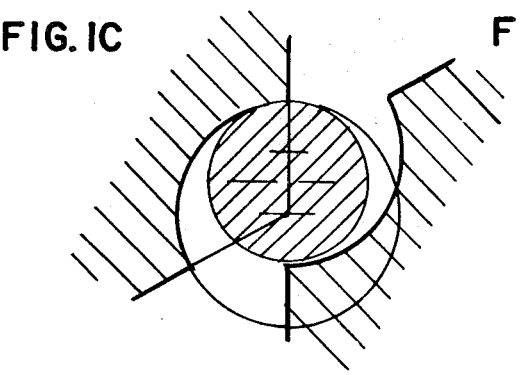
FIG. ID
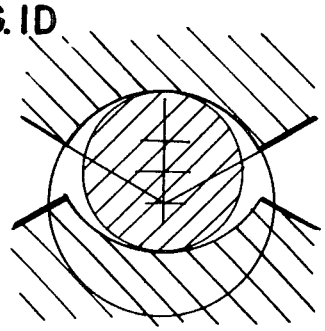
FIG. IE
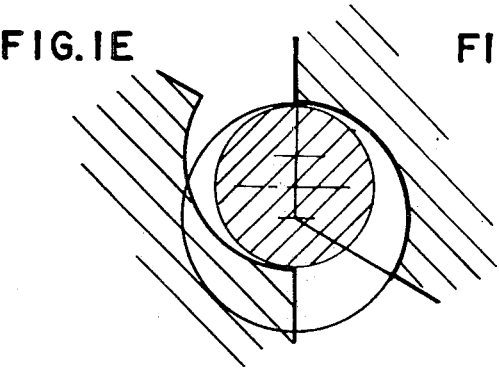
FIG. IF
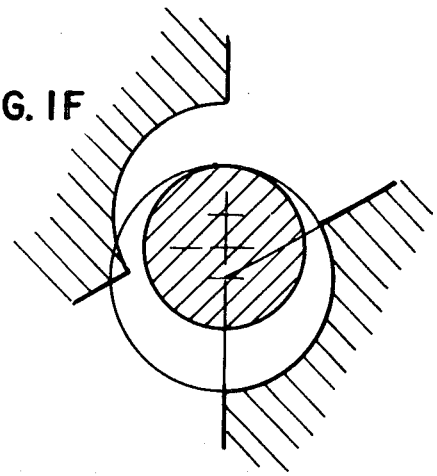
INVENTOR
PROF.DR. ZDZISLAW MARCINIAK
Stevens, Davis, Miller & Mosher
ATTORNEYS

United States Patent Office 3,608,346
Patented Sept. 28, 1971

3,608,346
METHOD OF PRODUCING METAL OBJECTS HAVING ROTATIONAL SMOOTH OR TOOTHED SURFACES, AND DEVICE FOR PUTTING THE METHOD INTO EFFECT
Zdzislaw Marciniak, Warsaw, Poland, assignor to Politechnika Warszawska, Warsaw, Poland
Filed Feb. 4, 1969, Ser. No. 796,451
Claims priority, application Poland, Feb. 6, 1968, P 118,921
Int. Cl. B21j 5/12, 7/16
U.S. Cl. 72—76
4 Claims

ABSTRACT OF THE DISCLOSURE

A method and apparatus for producing metal objects having a rotational surface of a specific configuration by means of exerting pressure on the object in at least two radial directions by tools having shaping surfaces which are rolled in the circumferential direction along the object to be treated. The objects are plastically shaped in a cyclical manner with a plurality of successively repeated cycles to produce the individual segment of rotary surface or segment of inner toothing whose theoretical rolling surface, together with its prolongation beyond the tool, forms a cylindrical surface which is internally tangential to the cylindrical rolling surface of the tooth being worked. For each successive phase of each cycle, the object being worked is axially shifted by a feed quantity within the time when the object is out of contact with the tools.

---

Figure 2:
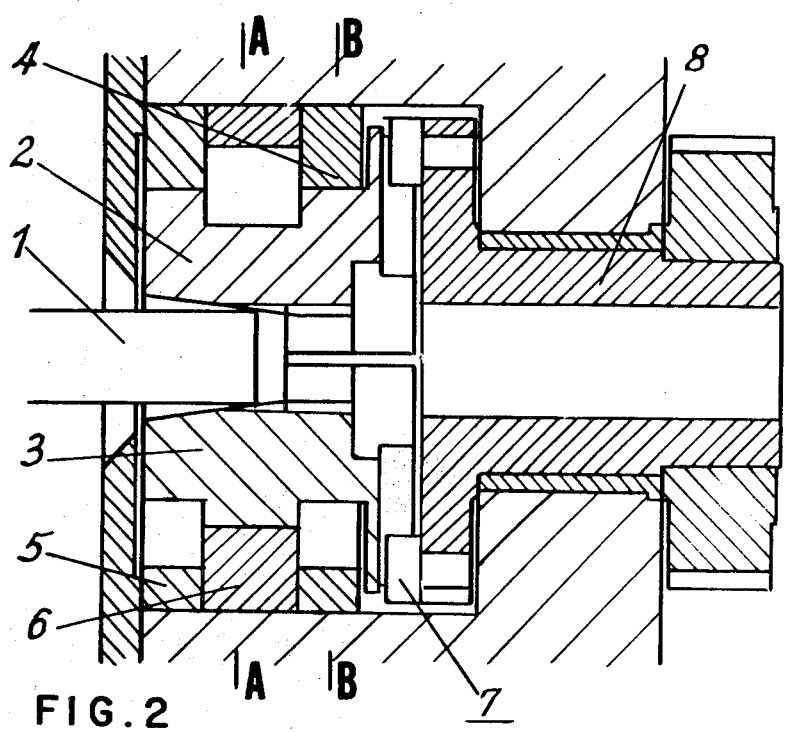

The present invention relates to a method of producing metal objects having rotational, smooth or toothed surfaces, and a device for putting the method into effect.

The invention relates to a method of producing metal objects having rotational, smooth or toothed surfaces, hence being in form of e.g. smooth or multi-stage shafts, sleeves, cylindrical gear wheels and serrated or splined shafts of an involute profile, by means of radial pressure exerted on the machined object by two or more jaws, the surfaces of which are turning along the surface of the material to be deformed.

Due to the jaw pressure the treated object is either elongated axially, whereby its diameter is decreased, or its cylindrical or conical surface has pressed therein periodically repeated convexities and cavities having the shape of e.g. teeth, notches etc.

The method according to the invention is a modification of the known method of transverse rolling of round objects by means of two or three rotary cylinders the conveniently shaped outer surfaces of which, while rolling along the surface of the treated object, bring about formation of a screw thread, teeth etc., dished out on said surface. This rolling method exhibits, however, the following difficulties:

When two cylindrical smooth outer surfaces, that of the tool and that of the object to be shaped, come into contact with one another, the surface of their adherence is of an inconsiderable width in the circumferential direction which brings about the plastic deformation area into the material not far from its surface. Consequently, when the cylinder is turning, a relatively thin but strongly plastically deformed upper layer arises, whereas its core remains in an elastic state. For this reason, when using this method, one does not succeed in decreasing the diameter of the cylinder, since such a deformation requires a plastic elongation of the core.

When teeth are being rolled by means of outwardly toothed tools, on the tips and spaces of the teeth there will arise large differences in the circumferential speed of the tool and of the treated material, this causing a considerable friction of the material against the surface of the tool and shortening of its service-life.

The profile of the teeth of the tool differs considerably from the profile of the spaces of the wheel to be shaped, this entailing a small surface of material clinging to the tool and an inconsiderable range of the plastified area. The tool teeth are at their base considerably narrower than the width of the spaces of the wheel to be treated, this decreasing the strength of the tool.

The shaping method according to the invention consists in cyclically turning the work object along the concave active faces of two or more tools having the form of jaws. If the purpose of the operation is the reduction of the diameter of a round object e.g. a cylinder, then the turning surface of each of said jaws is a sector of a smooth rotational inner surface e.g. a conical surface. In the case of jaws designed for pressing-in wheel teeth, the active face of each of said jaws is toothed, the theoretical turning surface of said inner toothing, when extended beyond the jaw, is the surface of a cylinder having a diameter D which is greater than the diameter of the object d by the multiple of the module pitch m.

In both cases the rolling surface of each of said jaws is internally tangential to the rolling surface of the work object, both these surfaces rolling along one another in the shaping process with a constant speed. In periods where the tangency point of both rolling surfaces is situated on the real surface of the jaw (FIGS. 1C, 1D, and 1E) shaping of the material takes place, whereas in the remaining periods of each cycle, when the tangency point of said surfaces is situated on the theoretical extension of the rolling surface of the tool (FIGS. 1A, 1B, and 1F) the material will lose contact with the tool.

In periods in which all the jaws are out of contact with the object being shaped, it will be axially shifted by feed quantities so that the length of the shaft section being shaped or the width of the toothed ring being shaped do not depend upon the length of the shaping surface of the jaws.

Furthermore, due to the use of internally toothed tools for pressing-in wheel teeth, one obtains a nearly entire equality of the circumferential speeds of the material and tool in all points of the tooth profile and also a considerable shape approximation of the tool tooth to the shape of the space pressed therein, which influences advantageously the tool strength.

In case of rolling by means of smooth jaws whose curvature in the plane perpendicular to an axis, e.g. of a shaft, differs very slightly from the curvature of its surface, the width of the adhering area of material and tool increases in the circumferential direction including a considerable part of the jaw surfaces which favors the axial extension of the material. As a result, the method according to the invention provides the possibility of plastically shaping such objects which have been rolled by means of hitherto known methods but without satisfactory results due to the above mentioned difficulties.

The device allowing the rolling according to the method of the invention is illustrated in the drawings, by two examples of execution differing from each other by the kinematic system and application range.

Figure 3:
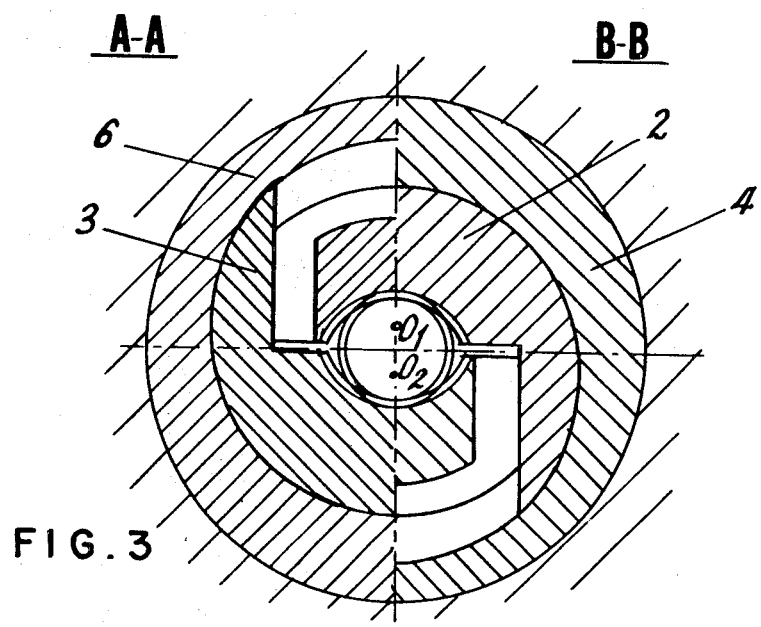
Figure 4:
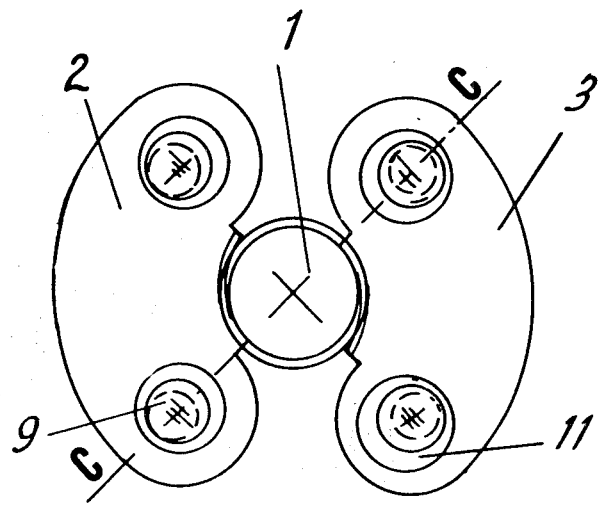
Figure 5:
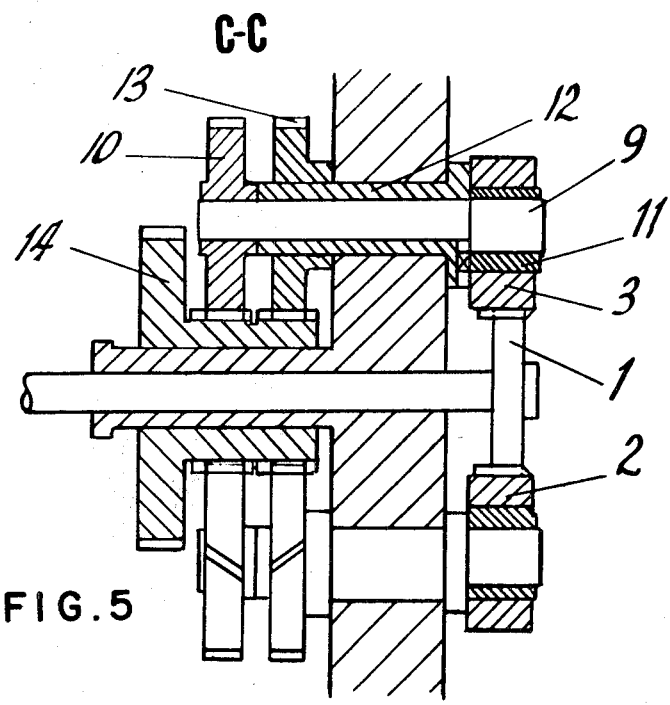

FIGS. 1A to 1F show the operating method of the device with two jaws rotating around parallel axes, FIGS. 2 and 3 show an axial section and a cross-section, respectively, of said device, and FIGS. 4 and 5 show an end view and a cross-section, respectively, in the second example of execution of the device whose jaws perform parallel movement along circular paths.

Both of these illustrated devices may be intended for rolling teeth and for decreasing the shaft diameter. In this latter case, instead of toothed jaws, jaws having a smooth operating surface are used.

In the device as shown in FIGS. 2 and 3 on the surface of shaft 1 the toothing is pressed in under the influence of the pressure of two jaws 2 and 3 whose internal shaping surfaces are segments of wheels with cylindrical inner toothing.

Jaw 3 slides or rolls along the cylindrical inner surface of an eccentric sleeve 6 whereas jaw 2 slides or rolls along the surfaces of eccentric sleeves 4 and 5. The rolling surfaces of sleeve 6 and of sleeves 4 and 5 are shifted in relation to each other by a magnitude $2e$ (FIG. 1A) which is equal to the difference existing between the diameters of the rolling surfaces of the shaping tooth D and the tooth being shaped $d$. The drive of the two jaws is performed by the agency of a rotationally mounted sleeve 8 provided with two pins 7 the heads of which enter the grooves made on the front surface of jaws 2 and 3. The rotation of tool 8 in relation to the body produces a rotation of each of the jaws around their own axis $O_1$ or $O_2$ (FIG. 1A) the position of which in relation to said body remains unchanged. In FIGS. 1A to 1F there is shown the position of the jaws in six successive phases forming one full cycle.

The second device shown by way of example in FIGS. 4 and 5, allows obtaining the same movements in relation to material and tools by means of a different kinematic system. The jaws 2 and 3 are provided with inner teeth in the form of wheel segments having a diameter D. Each of the jaws is put in motion with the aid of two eccentric shafts 9 driven by gear wheels 10 having oblique teeth.

Between the jaws 2 or 3 and the eccentric necks of shafts 9 there are eccentric sleeves 11 driven by the coupled sleeves 12, by means of gear wheels 13 having oblique teeth inclined oppositely to those of the wheels 10. All the four gear wheels 10 and the four gear wheels 13 are driven by one centrally located chevron gear 14 which, irrespective of rotation, is shiftable along the axis. One half of the width of the rim of gear 14 drives the wheels 10, whereas the second half of the width having oppositely inclined teeth drives the wheels 13. The axial displacement of the gear 14 gives therefore rise to simultaneous rotation, at a certain angle, of the four gear wheels 10 in relation to the wheels 13 which causes a change of the position of the eccentric sleeves 11 in relation to the eccentric necks of the shafts 9. This allows a continuous regulation of the resultant eccentricity $e$ (FIG. 1A) of the outer cylindrical surface of the sleeve 11 in relation to the axis of rotation of the shaft 9.

The rotation of the gear 14 causes a synchronous rotation of all the four shafts 9 together with the eccentric sleeves 11 mounted thereon, owing to which the jaws 2 and 3 are displaced in parallel, running along circular paths having a radius $e$. During these movements the jaws 2 and 3 maintain symmetry in relation to the center of the object 1 being worked.

If the rolling diameter of the teeth pressed in the wheel 1 is equal to $d$, then the diameter $2e$ of the circular path of the jaws 2 and 3 should be $$2e = D - d \approx \Delta z \cdot m$$

where $\Delta z$ means the difference between the number of teeth of the theoretical shaping wheel and that of the wheel being shaped, and $m$ is the module pitch. The wheel 1 being worked rotates uniformly with such a speed that it is displaced by a number of teeth equal to $\Delta z$, per rotation of the shafts 9.

The rolling method according to the invention is applicable in all branches of the metal industry for the cold or hot plastic shaping of smooth or offset shafts, multistage shafts, teeth of cylindrical gear wheels with upright or oblique teeth, and also shafts with serrated or spline surface having an involute profile etc. Such objects can be made of various kinds of sufficiently plastic metals, hence for instance of steel, aluminum and its alloys, copper and its alloys, and also of non-metallic materials being able to be shaped in a plastic way.

What is claimed is:

1. A method for producing cylindrical metal workpieces having smooth or toothed surfaces, hence being in the form of smooth or multistage shafts, sleeves, cylindrical gear wheels, and serrated or splined shafts of an involute profile comprising cyclically exerting radial pressure on the workpiece by at least two tools in the form of jaws that roll in the circumferential direction along the surfaces of the workpiece, the axes of said tools being fixed parallel to but offset from the axis of said workpiece, an inner shaping surface of each of said jaws being a segment whose theoretical rolling surface together with its prolongation beyond the tool forms a cylindrical surface which is internally tangent to the cylindrical rolling surface being worked, and axially shifting said workpiece by a feed quantity within the time in which said workpiece is out of contact with the tools.

2. A device for producing workpieces having rotational smooth or toothed surfaces comprising at least two eccentric sleeves having inner cylindrical leading surfaces with axes parallel to but shifted in relation to the axis of the workpiece by a distance equal to the difference between the radii of both the leading surfaces and the workpiece, and working jaws mounted within said eccentric sleeves located in such a manner that said jaws slide along the leading surfaces of the appurtenant sleeves thus insuring a synchronous rotation of each jaw around its own axis and cyclical contact with said workpiece to exert radial pressure thereagainst.

3. A device for producing workpieces having rotational smooth or toothed surfaces comprising at least two pairs of synchronously rotating eccentric shafts, each pair of shafts driving individual shaping jaws along circular paths, the diameter of which is equal to the difference existing between the diameters of the two cylindrical rolling surfaces of the jaws and the workpiece.

4. A device as claimed in claim 3 further comprising a centrally driven chevron gear and first and second gear means driven by said chevron gear, said first gear means driving said eccentric shafts in a first direction by being in mesh with one half the width of the chevron gear, said second gear means driving said eccentric sleeves in the opposite direction by being in mesh with oppositely inclined teeth on the other half of said chevron gear, eccentric portions of said shafts being rotationally placed within said eccentric sleeves and continuously adjusted by rotation into their proper position through the change of their mutual position in the axial direction.

References Cited

UNITED STATES PATENTS

| | | | |
|---|---|---|---|
| 767,314 | 8/1904 | Sandner | 72—77 |
| 1,123,179 | 12/1914 | Davis | 72—77 |
| 1,450,947 | 4/1923 | Gill | 72—77 |
| 1,549,527 | 8/1925 | Fielding | 72—189 |

FOREIGN PATENTS

| | | | |
|---|---|---|---|
| 585,377 | 10/1959 | Canada | 72—77 |

LOWELL A. LARSON, Primary Examiner

U.S. Cl. X.R.

72—191